US011891296B2

(12) United States Patent
Fachini

(10) Patent No.: US 11,891,296 B2
(45) Date of Patent: Feb. 6, 2024

(54) DISTRIBUTION MANIFOLD FOR MULTI-PORT FUEL DISTRIBUTION

(71) Applicant: Tyton Holdings, Inc., Addison, TX (US)

(72) Inventor: Daniel Fachini, Littleton, CO (US)

(73) Assignee: Tyton Holdings, Inc., Addison, TX (US)

( * ) Notice: Subject to any disclaimer, the term of this patent is extended or adjusted under 35 U.S.C. 154(b) by 232 days.

(21) Appl. No.: 17/508,339

(22) Filed: Oct. 22, 2021

(65) Prior Publication Data

US 2022/0127133 A1 Apr. 28, 2022

Related U.S. Application Data

(60) Provisional application No. 63/104,774, filed on Oct. 23, 2020.

(51) Int. Cl.
*B67D 7/78* (2010.01)
*B67D 7/76* (2010.01)
*B67D 7/16* (2010.01)

(52) U.S. Cl.
CPC ................. *B67D 7/78* (2013.01); *B67D 7/16* (2013.01); *B67D 7/76* (2013.01); *B67D 2210/00007* (2013.01)

(58) Field of Classification Search
CPC ... B67D 7/78; B67D 7/16; B67D 7/76; B67D 2210/00007
USPC ........................................... 222/173; 141/231
See application file for complete search history.

(56) References Cited

U.S. PATENT DOCUMENTS

| | | | | |
|---|---|---|---|---|
| 6,488,057 B1 * | 12/2002 | Tatsuno | B67D 7/065 705/413 |
| 7,328,728 B1 * | 2/2008 | Vilar | B67D 7/845 137/565.17 |
| 7,628,182 B2 * | 12/2009 | Poulter | B67D 7/36 141/237 |
| 7,726,585 B2 * | 6/2010 | Pannell | A01M 1/24 239/269 |
| 8,429,095 B1 * | 4/2013 | Ryan | G06Q 20/342 700/282 |
| 8,807,599 B2 * | 8/2014 | Brown | G09F 21/048 141/98 |
| 8,905,089 B2 * | 12/2014 | Evans | B67D 7/348 141/94 |
| 9,981,840 B2 * | 5/2018 | Shock | B67D 7/465 |
| 11,208,880 B2 * | 12/2021 | Yeung | F02M 43/00 |
| 11,208,953 B1 * | 12/2021 | Yeung | F02C 6/00 |
| 11,268,346 B2 * | 3/2022 | Yeung | F02C 7/32 |
| 11,408,794 B2 * | 8/2022 | Yeung | F02C 7/222 |
| 2002/0139438 A1 * | 10/2002 | Lange | B67D 7/3209 141/231 |

(Continued)

*Primary Examiner* — Paul R Durand
*Assistant Examiner* — Michael J. Melaragno
(74) *Attorney, Agent, or Firm* — Price Heneveld LLP

(57) ABSTRACT

A fuel distribution system includes a fuel intake in communication with at least one fuel source that delivers a fuel through a fuel path. A filtering mechanism is positioned within the fuel path. A surge tank operates to maintain a minimum fluid pressure within the fuel path. A fuel manifold selectively delivers the fuel to a plurality of external fuel couplings. A flow meter monitors a flow of the fuel through the fuel manifold. The plurality of external fuel couplings are configured to contemporaneously deliver the fuel at a consistent flow rate.

20 Claims, 12 Drawing Sheets

(56) References Cited

U.S. PATENT DOCUMENTS

| | | | | |
|---|---|---|---|---|
| 2004/0045625 | A1* | 3/2004 | Gray | B67D 7/78 141/4 |
| 2006/0118201 | A1* | 6/2006 | Li | F17C 11/005 141/231 |
| 2009/0314384 | A1* | 12/2009 | Brakefield | B67D 7/04 141/231 |
| 2011/0048572 | A1* | 3/2011 | Batson | B64F 1/28 141/1 |
| 2012/0079880 | A1* | 4/2012 | Freitag | G01M 10/00 73/198 |
| 2013/0136435 | A1* | 5/2013 | Graibus | F22D 5/26 122/412 |
| 2021/0032092 | A1* | 2/2021 | Duncan | B67D 7/0266 |
| 2022/0127133 | A1* | 4/2022 | Fachini | B67D 7/76 |
| 2022/0371556 | A1* | 11/2022 | Tripathi | B67D 7/04 |

* cited by examiner

Method 400 for Distributing Fuel from a Fuel Source using a Distribution Manifold

DISTRIBUTION MANIFOLD FOR MULTI-PORT FUEL DISTRIBUTION

CROSS-REFERENCE TO RELATED APPLICATION

This application claims priority to and the benefit under 35 U.S.C. § 119(e) of U.S. Provisional Patent Application No. 63/104,774, filed on Oct. 23, 2020, entitled "DISTRIBUTION MANIFOLD FOR MULTI-PORT FUEL DISTRIBUTION," the entire disclosure of which is hereby incorporated herein by reference.

FIELD OF THE DISCLOSURE

The present invention generally relates to fuel distribution systems, and more specifically, a fuel distribution system having a fuel manifold for receiving fuel from a fuel source and distributing fuel to a plurality of fuel outlets, where the distribution manifold can be moved from one location to another, based upon fueling needs.

BACKGROUND OF THE DISCLOSURE

Within various worksites and drilling fields, it is necessary for equipment to be moved frequently from one location to another for operation and servicing needs. This equipment, for fueling, is directed to a source location where fueling resources can be provided. Typically, fueling trucks are driven to a certain location and fuel is provided directly from the fueling truck to the individual pieces of equipment.

SUMMARY OF THE DISCLOSURE

According to a first aspect of the present disclosure, a fuel distribution system includes a fuel intake in communication with at least one fuel source that delivers a fuel through a fuel path. A filtering mechanism is positioned within the fuel path. A surge tank operates to maintain a minimum fluid pressure within the fuel path. A fuel manifold selectively delivers the fuel to a plurality of external fuel couplings. A flow meter monitors a flow of the fuel through the fuel manifold. The plurality of external fuel couplings are configured to contemporaneously deliver the fuel at a consistent flow rate.

According to another aspect of the present disclosure, a fuel distribution system includes a fuel path attached to a structural frame. A fuel intake is in selective communication with a fuel source. The fuel intake delivers fuel from the fuel source to the fuel path. A surge tank of the fuel path is positioned within the structural frame. The surge tank operates to maintain a minimum fluid pressure within the fuel path. A fuel manifold is attached to the structural frame and selectively delivers the fuel to a plurality of external fuel couplings. The plurality of external fuel couplings are positioned to extend from a common side of the structural frame. A flow meter monitors a flow rate of the fuel through the fuel manifold. The plurality of external fuel couplings are each configured to contemporaneously deliver the fuel at a consistent flow rate.

According to yet another aspect of the present disclosure, a fuel distribution system includes a fuel path attached to a structural frame. A fuel intake is in selective communication with a fuel source. The fuel intake delivers fuel from the fuel source to the fuel path. A surge tank of the fuel path is positioned within the structural frame. The surge tank operates to maintain a fluid pressure within the fuel path at a minimum fluid pressure. A fuel manifold is attached to the structural frame and selectively delivers the fuel to a plurality of external fuel couplings. A flow meter monitors a flow rate of the fuel through the fuel manifold and wherein the plurality of external fuel couplings are configured to contemporaneously deliver the fuel at a consistent flow rate. A pressure relief valve selectively operates to divert at least a portion of the fuel to an external location when the fluid pressure in the fuel path reaches a predetermined upper limit. The flow meter is in communication with the surge tank and the pressure relief valve to maintain a flow of fuel through the fuel manifold to be the consistent flow rate.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
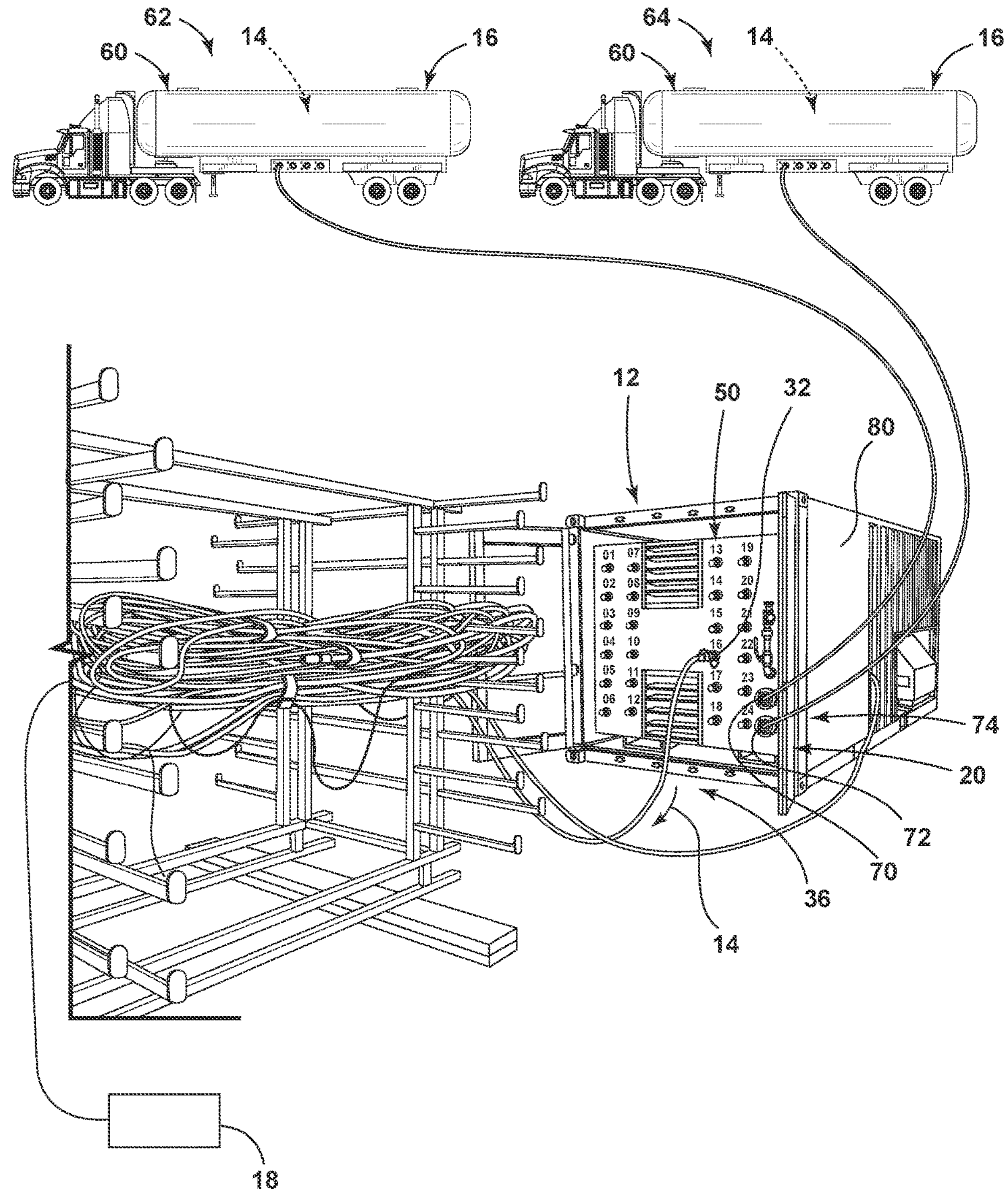
FIG. 1 is a perspective view of an aspect of the fuel distribution system placed within a container housing.

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

With reference to FIGS. 1-5 and 7-12, reference numeral 10 generally refers to a distribution fuel manifold that is incorporated within a fuel distribution system 12 for delivering fuel 14 from at least one fuel source 16 to a number of pieces of equipment 18. The distribution fuel manifold 10 can be used for contemporaneously fueling a number of pieces of equipment 18 using the single fuel source 16. According to various aspects of the device, the fuel distribution system 12 includes a fuel intake 20 having at least one fuel inlet 22 that delivers fuel 14 through a fuel path 24. A filtering mechanism 26 is positioned within the fuel path 24. A surge tank 28 is positioned relative to the fuel path 24 and operates to maintain a minimum fluid pressure 30 within the fuel path 24. The fuel manifold 10 delivers and distributes the fuel 14 to a plurality of external fuel couplings 32. A flow meter 34 is positioned along the fuel path 24 and monitors a flow 36 of the fuel 14 into the fuel manifold 10. The plurality of external fuel couplings 32 are configured to contemporaneously deliver the fuel 14 to a plurality of pieces of powered equipment 18 at a consistent rate of flow 36. The consistent rate of flow 36 can be a flow 36 of the fuel 14 that is substantially continuous and at a generally even volume of fuel 14 over time. A portion of the external fuel couplings 32 include fuel regulators 40 that are configured to deliver the fuel 14 at a regulated pressure 42 that is typically less than the fluid pressure 30 present in the fuel path 24. The flow meter 34 can be an analog meter or can include a digital flow meter 34 with remote monitoring capabilities. Using a flow meter 34 with remote monitoring capabilities, it is possible to monitor the operation and efficiency of the fuel distribution system 12, as well as a number of fuel distribution systems 12 that may be located apart from one another and over a large area.

Referring again to FIGS. 1-5 and 7-12, the fuel distribution system 12 is typically attached to a structural frame 50. In this manner, the fuel intake 20, the surge tank 28 and the fuel manifold 10 are attached to the structural frame 50. This structural frame 50 allows the fuel distribution system 12 to be manipulated and moved to various locations as needed for the particular job site. The structural frame 50 is configured to be moved by a front loader 52, forklift, crane, or other similar powered equipment 18 that can lift the structural frame 50 and the components of the fuel distribution system 12 for relocation to various fueling or refueling sites, without causing damage to the various components of the fuel distribution system 12.

Figure 2:
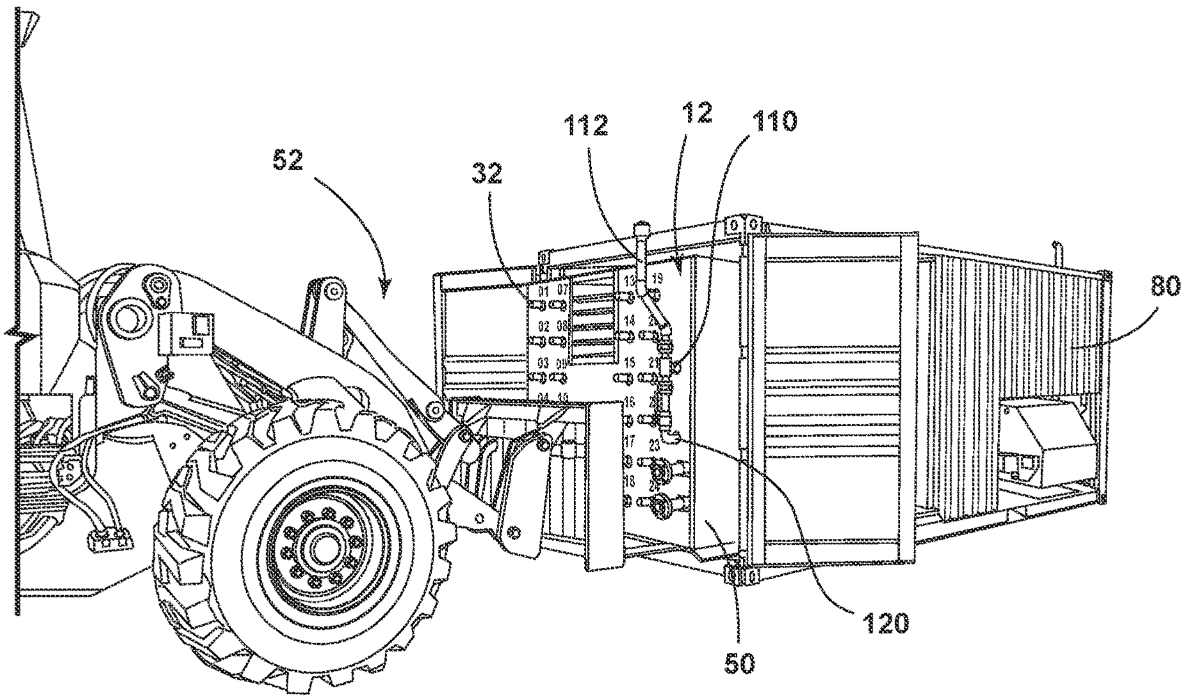
FIG. 2 is a perspective view of an aspect of a fuel distribution system being moved with respect to a container housing.
Figure 3:
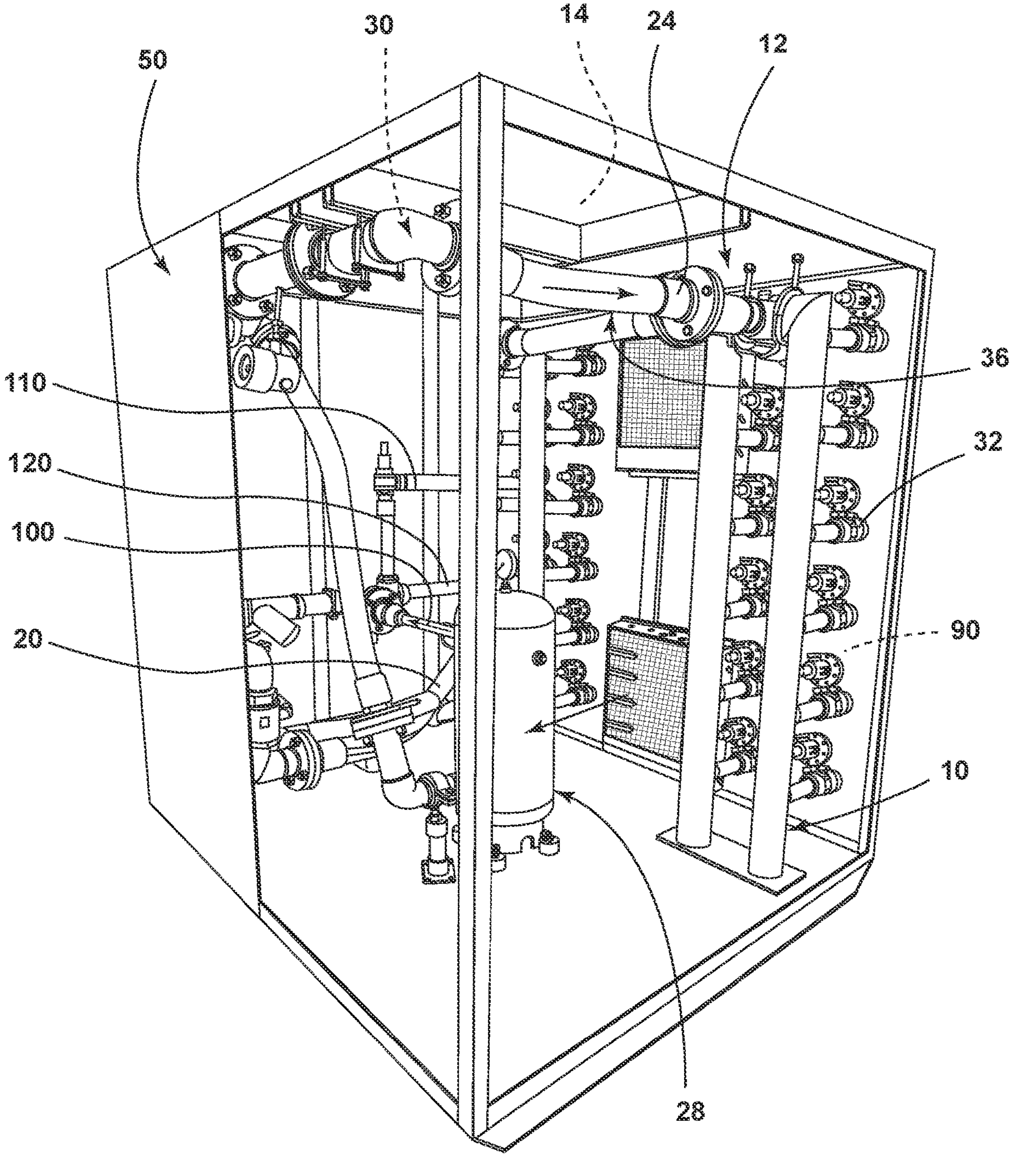
FIG. 3 is a side perspective view of an aspect of the fuel distribution system positioned within a structural frame.
Figure 4:
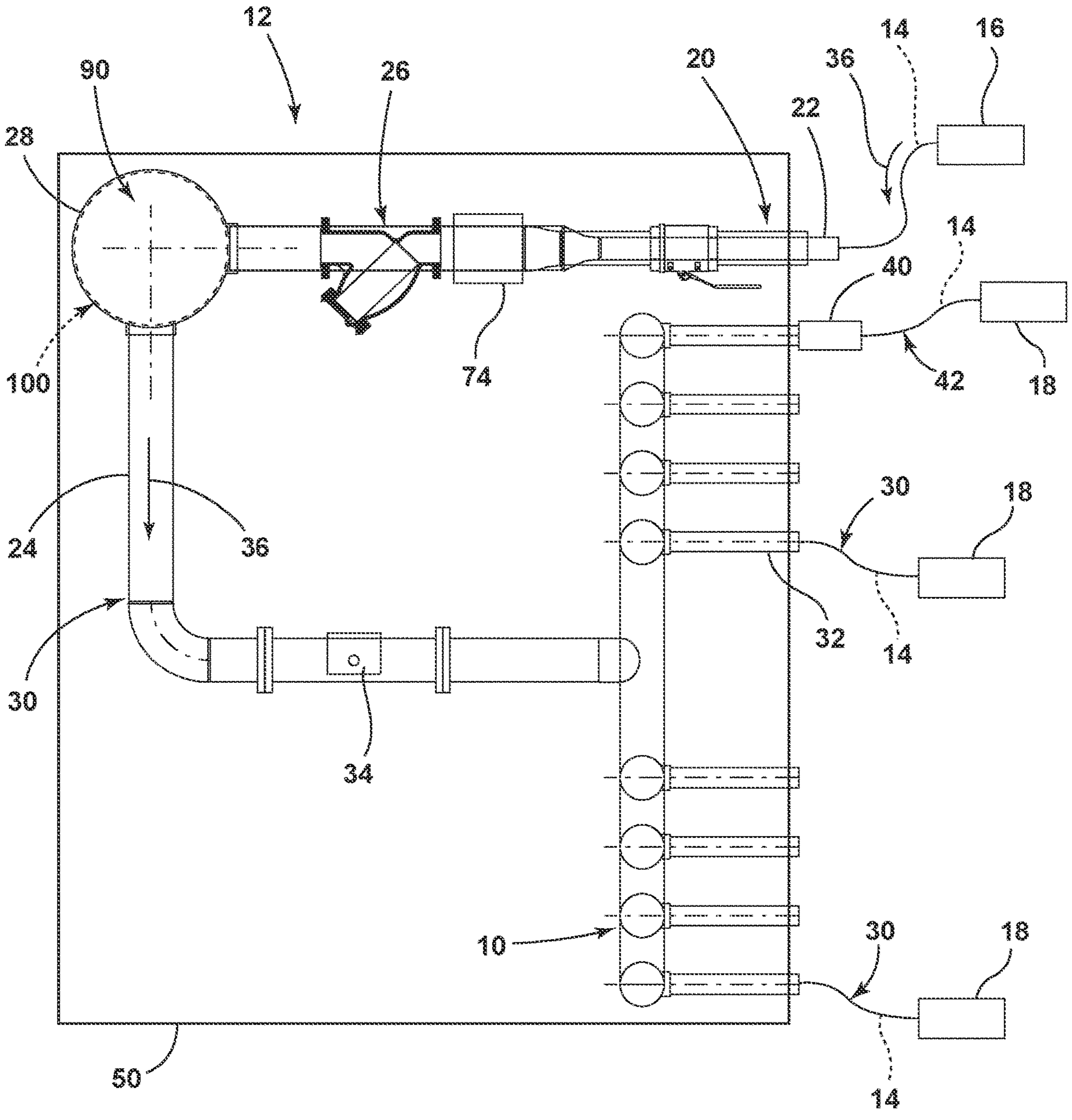
FIG. 4 is a schematic top plan view of an aspect of the fuel distribution system.
Figure 5:
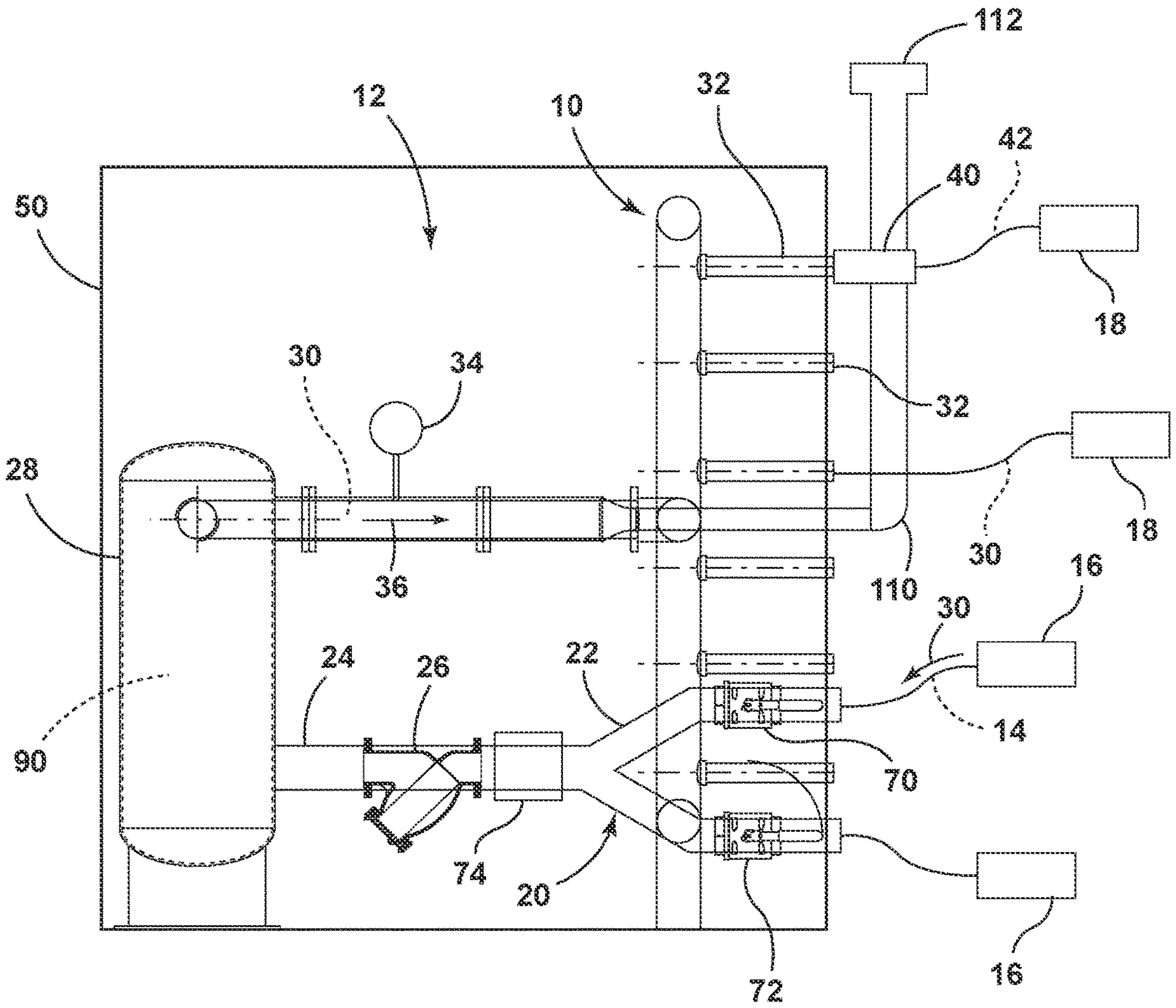
FIG. 5 is a side elevation view of the fuel distribution system of FIG. 4.
Figure 6:
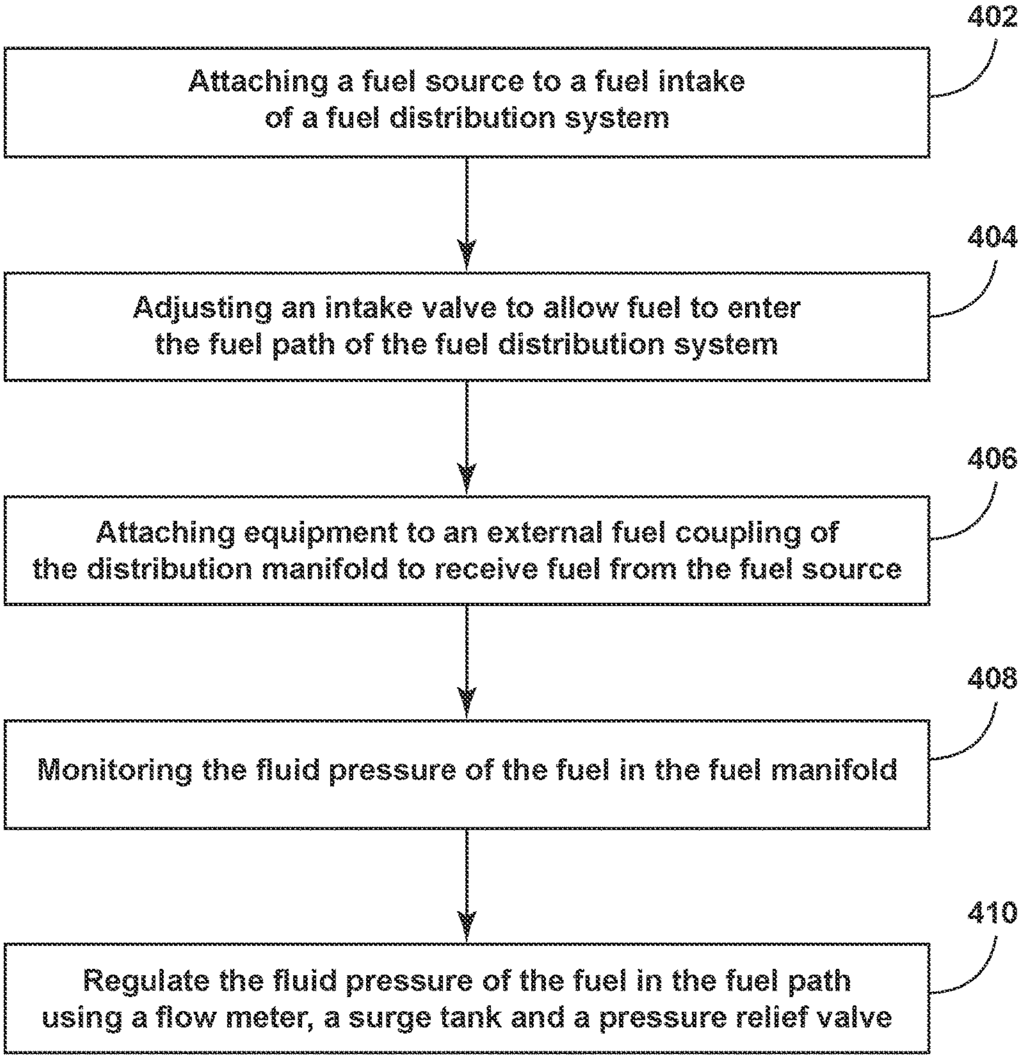
FIG. 6 is a linear flow diagram illustrating a method for distributing fuel resources using an aspect of the fuel distribution system.
Figure 7:
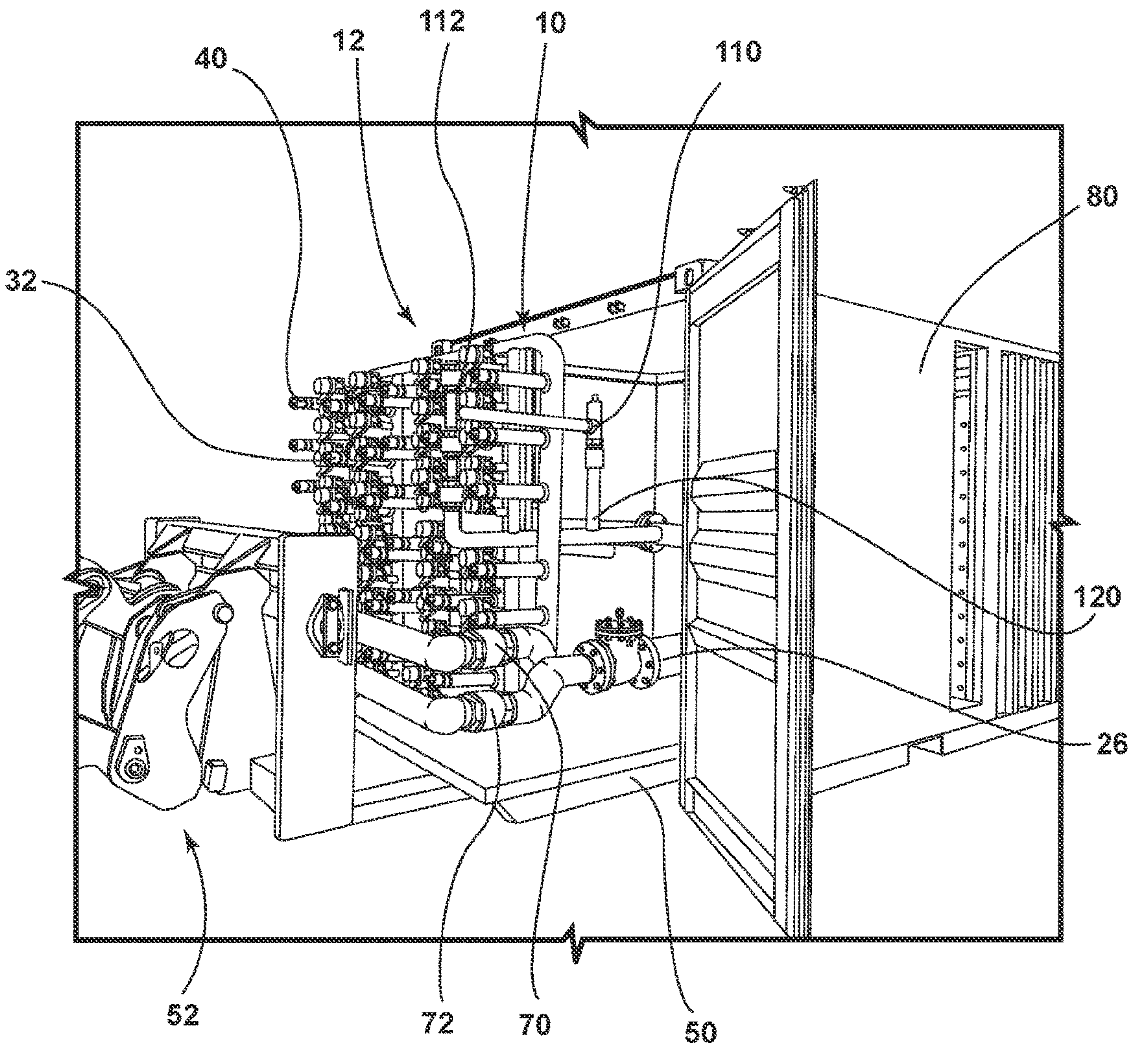
FIG. 7 is a perspective view of an aspect of the fuel distribution system being moved with respect to a container housing.
Figure 8:
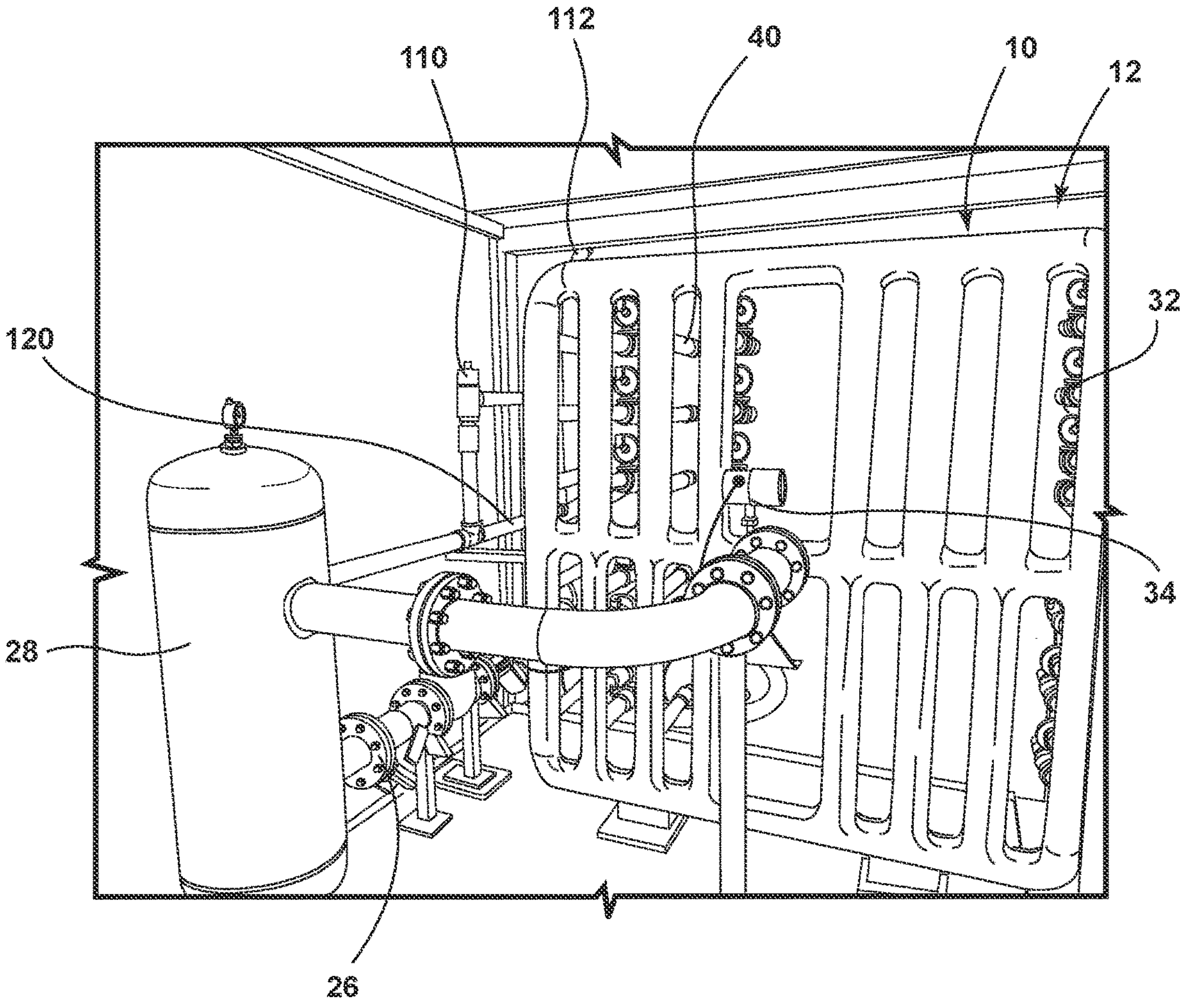
FIG. 8 is a perspective view of an aspect of the fuel distribution system placed within a container housing.
Figure 9:
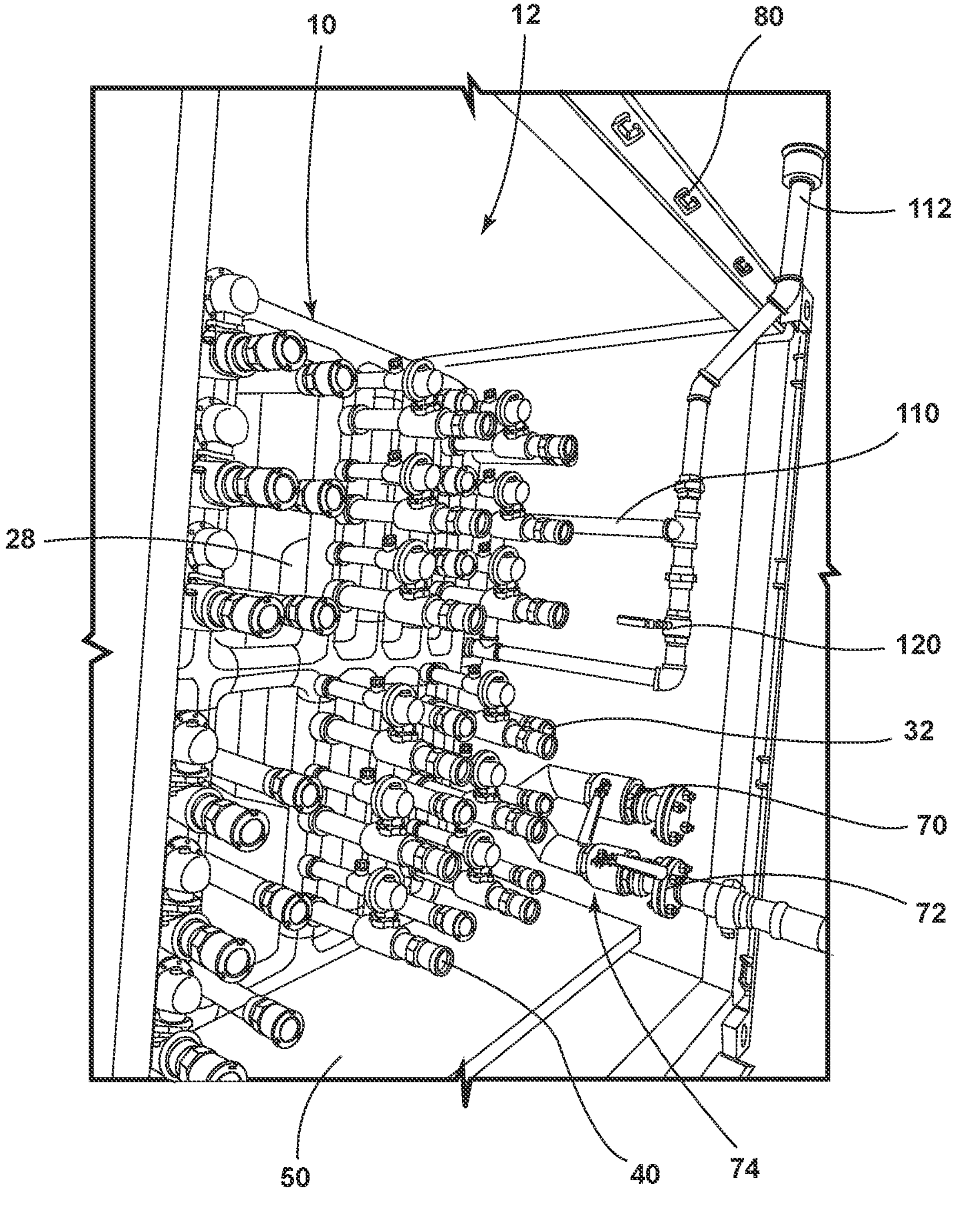
FIG. 9 is a perspective view of an aspect of the fuel distribution system placed within a container housing.
Figure 10:
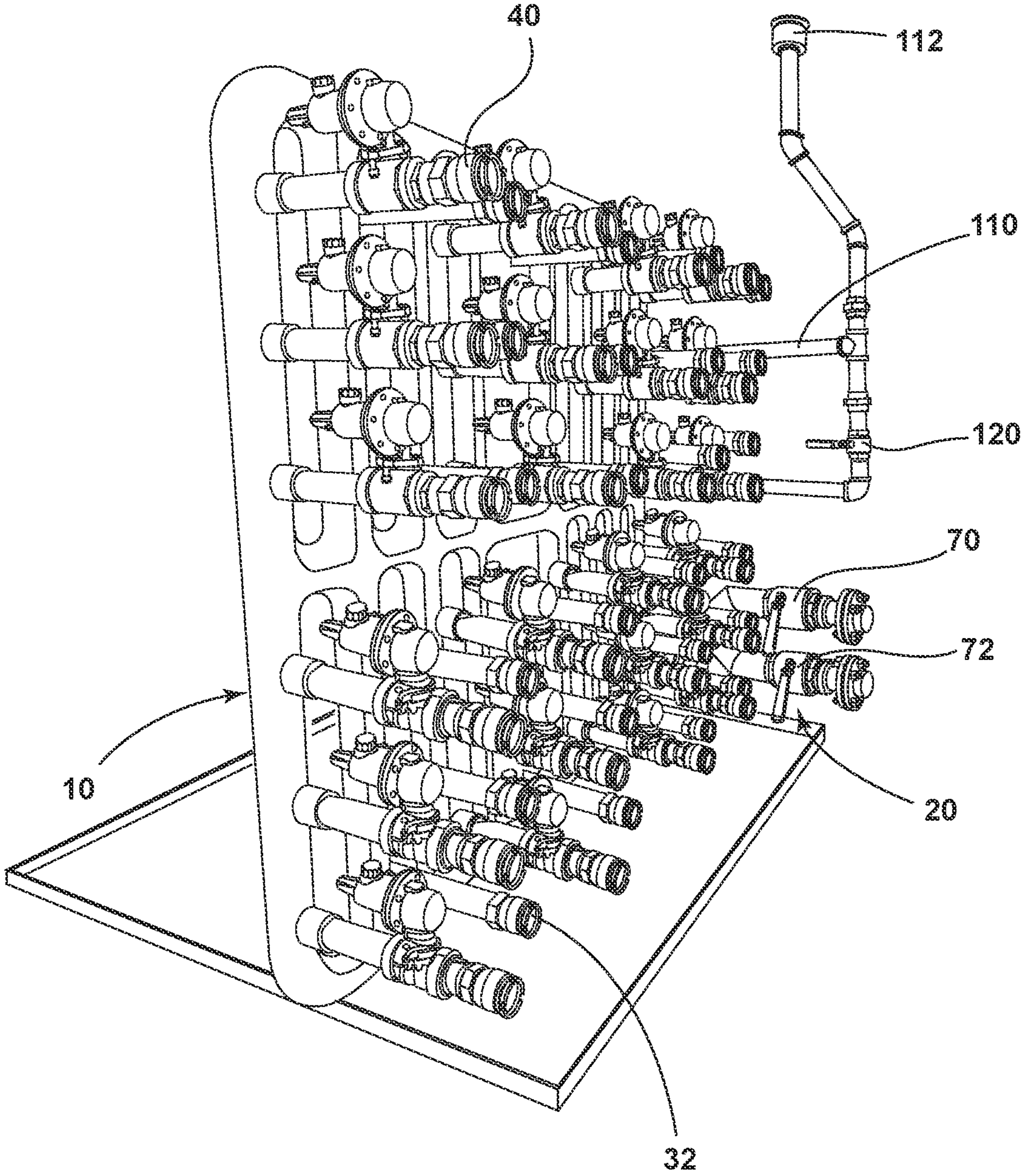
FIG. 10 is a side perspective view of an aspect of the fuel distribution system.
Figure 11:
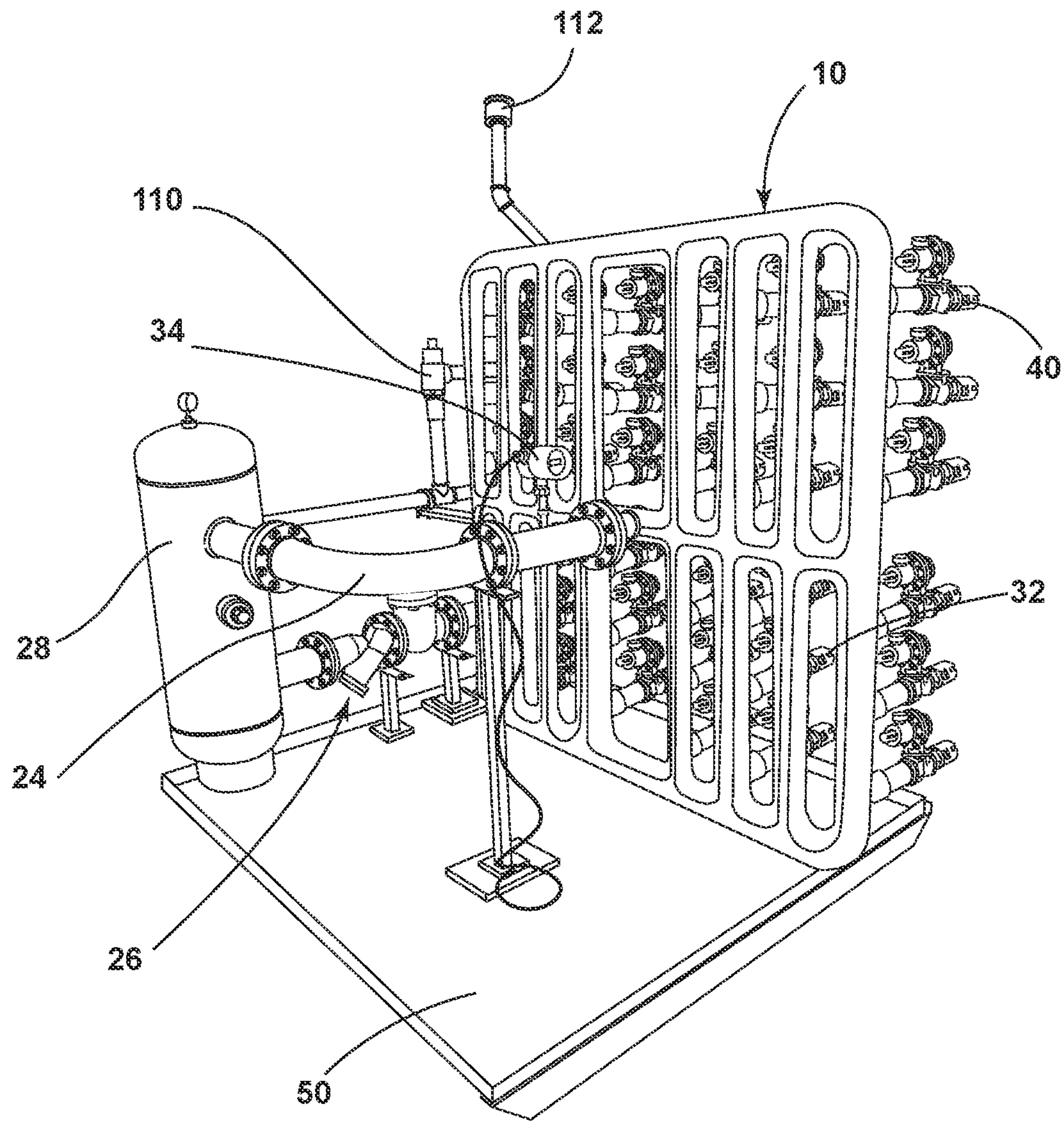
FIG. 11 is another side perspective view of the fuel distribution system of FIG. 10.
Figure 12:
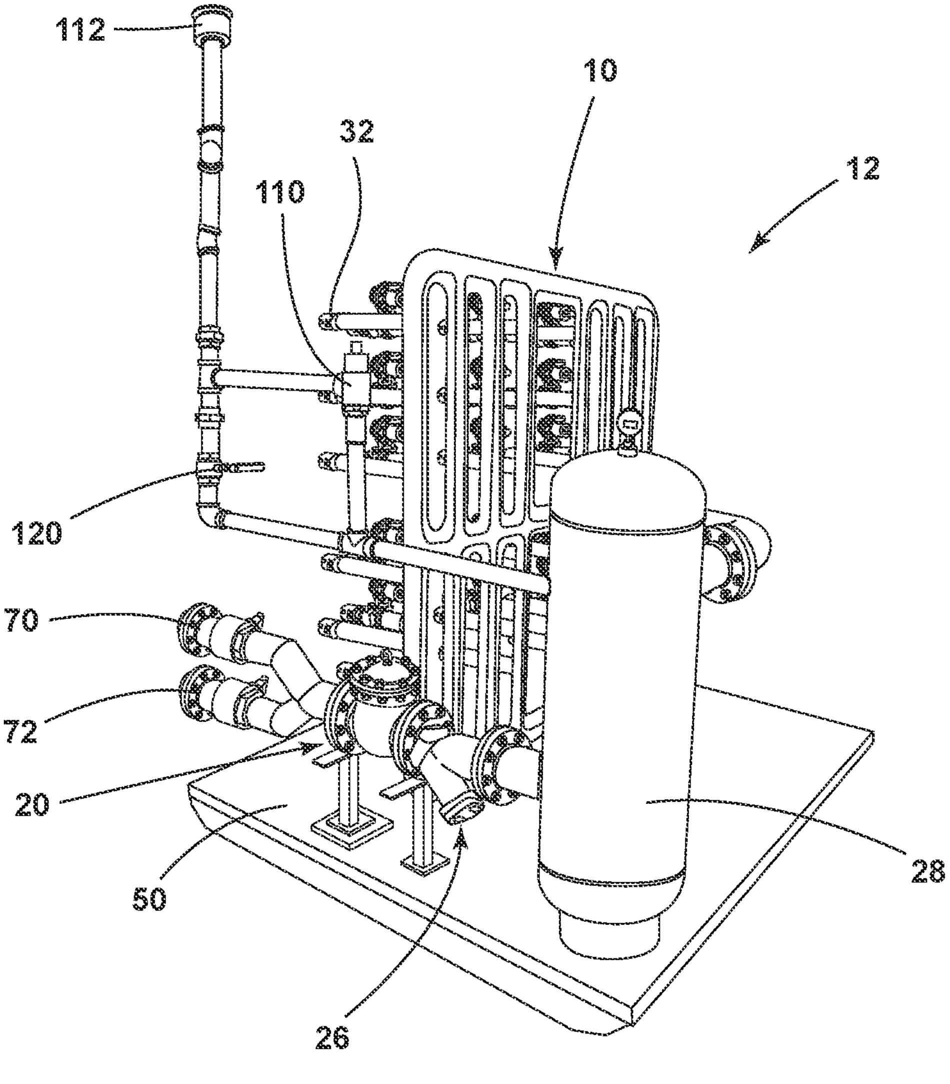
FIG. 12 is another side perspective view of the fuel distribution system of FIG. 10.

As exemplified in FIGS. 2 and 7, the fuel distribution system 12 is intended to be mobile so that it can be moved to various locations within, in certain conditions, expansive job sites. By way of example, and not limitation, oil drilling and oil fracking sites may cover large expanses of land. The ability to move the fuel distribution system 12 from one location to another to be near the equipment 18 being used on the site is advantageous. The fuel distribution system 12 provides a movable yet centralized fuel distribution system 12 that can be accessed by a fuel source 16, typically fuel trucks 60, as well as the individual pieces of equipment 18 being fueled for operation or fuel storage.

Referring again to FIGS. 1, 4-5 and 9-12, the fuel intake 20 can include first and second intakes 70, 72 that are positioned on the exterior of the structural frame 50. These first and second intakes 70, 72 can be coupled with two separate fuel sources 16, such as fuel trucks 60 or other similar fuel sources 16 that can operate as a first fuel source 62 and a second fuel source 64 that cooperatively engage the first and second intakes 70, 72, respectively. The first and second intakes 70, 72 can be coupled to an intake valve 74 that is selectively operated to place one of the first and second intakes 70, 72 in fluid communication with the fuel path 24. Accordingly, during use of the fuel distribution system 12, two separate fuel trucks 60 or other forms of the first and second fuel sources 62, 64 can be coupled, respectively, to the first and second intakes 70, 72. The intake valve 74 can be selected to allow for a flow 36 of fuel 14 from one of the first and second fuel sources 62, 64. When the first fuel source 62 has delivered the appropriate amount of fuel 14, the intake valve 74 can be switched to provide communication between the second fuel source 64 and the fuel path 24. After switching the intake valve 74, the first fuel source 62 can be disengaged from the first intake 70 and a third fuel source (not shown) can be moved in place to be coupled with the first intake 70. Through this system, a continuous supply of fuel 14 can be provided to the fuel distribution system 12 for providing continuous fuel 14 for operating the equipment 18. Depending on the design of the fuel distribution system 12 and the desired fueling capacity, additional intake valves 74 can be included.

In certain aspects of the device, the fuel distribution system 12 can be placed within a container housing 80 to provide protection and also to provide a secure storage place when not in use. When positioned within the container housing 80, only one side of the structural frame 50 may be accessible through an opening within the container housing 80. To allow for access to the first and second intakes 70, 72 and the external couplings, these features can be located on, and extend from, a common side of the structural frame 50. It is also contemplated that the container housing 80 may provide for more than one opening for accessing different portions of the structural frame 50 and the fuel distribution system 12. The container housing 80 can also include a generator or other electrical power source. This power source can be configured to provide electrical current for the operation of one or more electrical components of the fuel distribution system 12. Typically, the flow meter 34 will include a digital display that can require an external source of electrical current or a portable source of electricity, such as a battery.

Referring again to FIGS. 1-5 and 7-12, during operation of the fuel distribution system 12, fuel 14 is directed through the fuel intake 20 and into the fuel path 24. As discussed above, the fuel intake 20 includes first and second intakes 70, 72 that may be described as primary and secondary intakes. The fuel intake 20 is in selective communication with the various fuel sources 16, such as the first and second fuel source 62, 64. The filtering mechanism 26 positioned within the fuel path 24 can be in the form of a screen filter that removes particulate matter and other impurities from the fuel 14 moving from the fuel path 24. It is contemplated that other filtering mechanisms 26 may be utilized for separating particulate matter from the fuel 14. By way of example, and not limitation, a "Y" strainer may be used for separating out impurities and accumulating these impurities within a particular section of the filtering mechanism 26.

As exemplified in FIGS. 3-5 and 7-12, the surge tank 28 is coupled with the fuel path 24 and contains a reserve portion 90 of the fuel 14 delivered from the fuel source 16. The reserve portion 90 of the fuel 14 is temporarily stored within the surge tank 28. The temporary storage of this reserve portion 90 of fuel 14 within the surge tank 28 can be delivered into the fuel manifold 10 during periods of high demand. During this high-demand condition, many pieces of equipment 18 are being provided with fuel 14 at the same time. During these times of high demand, the equipment 18 may define a demand for a certain volume or pressure of fuel 14 from the fuel distribution system 12. This demand may exceed the volume and pressure of fuel 14 that can be provided by the fuel source 16. In such an instance, the equipment 18 may draw certain amounts of the reserve portion 90 of fuel 14 from the surge tank 28 in order to maintain the volume and pressure of the fuel 14 within the fuel path 24 being demanded by the equipment 18. Accordingly, the surge tank 28 can provide certain amounts of the reserve portion 90 of the fuel 14 to be disposed into the fuel path 24. Again, the provision of the reserve portion 90 of fuel 14 into the fuel path 24 helps to maintain the fluid pressure 30 and volume of the fuel 14 within the fuel path 24 during these high-demand periods of fueling. By way of example, and not limitation, the high-demand condition may be characterized by at least approximately 75 percent of the external fuel couplings 32 contemporaneously delivering fuel 14 to various pieces of powered equipment 18. Other usage ratios of the external fuel couplings 32 and rates of flow 36 of fuel 14 can also be indicative of a high-demand condition.

In various aspects of the device, the size of the surge tank 28 can vary depending upon the particular application and distribution capacity of the fuel distribution system 12. Typically, the fuel distribution system 12 and the fuel manifold 10 are sized such that all of the external fuel couplings 32 can be used for fueling equipment 18 at the same time, without experiencing a diminished fluid pressure 30 within the fuel path 24 of the fuel distribution system 12.

According to various aspects of the device, the pressure of the fuel 14 moving through the fuel path 24, typically in the form of back pressure, is provided by the fuel source 16, typically in the form of the fuel truck 60. At certain times, such as during a high-demand fueling, the surge tank 28 can be utilized to provide a supplemental fluid pressure 100 into the fuel path 24. As discussed above, this supplemental fluid pressure 100 typically results from the volume and pressure demand for fuel 14 from the equipment 18 being fueled by the fuel distribution system 12. Accordingly, the surge tank 28 operates with the equipment 18 and the remainder of the fuel distribution system 12 to maintain a minimum fluid pressure 30 within the fuel path 24 during periods of refueling.

The flow meter 34 that is attached to the fuel path 24 monitors a flow 36 of the fuel 14 into the fuel manifold 10. During certain fueling periods, the fluid pressure 30 may drop during high-demand conditions. The flow meter 34, which is in communication with the fuel path 24, is also in communication with the surge tank 28. The flow meter 34 provides an indication of a drop in the fluid pressure 30 within the fuel path 24. This indication of a drop in fluid pressure 30 is also indicative of a delivery of the reserve portion 90 of fuel 14 from the surge tank 28 into the fuel path 24. In this manner, the surge tank 28 helps to neutralize changes in the fluid pressure 30 of the fuel path 24. In periods of an increased fluid pressure 30, the surge tank 28 receives a portion of the fuel 14 from the fuel path 24 to decrease the fluid pressure 30, resulting in a capture of the reserve portion 90 of fuel 14 within the surge tank 28. Conversely, in periods of low fluid pressure 30, the demand for fuel 14 from the equipment 18 being fueled results in the reserve portion 90 of fuel 14 being delivered into the fuel path 24 to increase the fluid pressure 30.

In certain aspects of the device, it is also contemplated that the flow meter 34 may be in communication with the surge tank 28 and a controller for operating the surge tank 28 to inject at least some of the reserve portion 90 of fuel 14 contained within the surge tank 28 into the fuel path 24. Through the operation of the flow meter 34 and the surge tank 28, the minimum fluid pressure 30 within the fuel path 24 can be maintained.

As discussed above, the size of the surge tank 28 can vary depending upon the intended distribution capacity of the fuel distribution system 12. A fuel distribution system 12 having a larger number of external fuel couplings 32 or a higher minimum flow rate may incorporate a surge tank 28 having a larger capacity that can house a greater reserve portion 90 of fuel 14 therein.

Referring again to FIGS. 4-5 and 7-12, typically, the flow meter 34 is a digital sensor that is coupled to a low-voltage electricity source. This electricity source can be in the form of a generator placed within the fuel distribution system 12. Alternatively, the fuel distribution system 12 can couple with a portion of the container housing 80 having a separate electrical generator or electrical power source. Using a digital flow meter 34, precise measurements can be taken regarding the fluid pressure 30 within the fuel path 24. In addition, digital communication between the flow meter 34, the controller and the surge tank 28 can be accomplished during operation of the fuel distribution system 12.

The fuel 14 moved through the fuel path 24 of the fuel distribution system 12 is typically natural gas. It is contemplated that other fuels 14 may be utilized within the fuel distribution system 12. Components of the fuel distribution system 12 may require calibration or replacement depending upon the pressure and/or volume rates of the fuel 14 being delivered through the fuel distribution system 12.

As discussed previously, the fluid pressure 30 for the fuel 14 moving through the fuel path 24 is provided by the fuel truck 60 or other fuel source 16 for the fuel distribution system 12. In certain conditions, this fluid pressure 30 provided by the fuel source 16 may exceed a maximum fluid pressure 30 that is desirable within the fuel path 24. The fuel path 24 can include a pressure relief valve 110 that can be actuated where the fluid pressure 30 reaches a predetermined maximum pressure limit. The pressure relief valve 110 can be automated to expel an amount of the fuel 14 from the fuel manifold 10 or other portion of the fuel path 24 to lower the fluid pressure 30. This expelled gas can typically be released into the atmosphere. This pressure relief valve 110 can be a manually operated relief valve 110. In certain instances, the pressure relief valve 110 can be actuated through the fluid pressure 30 in the fuel path 24. In such an aspect of the device, when the fluid pressure 30 reaches or exceeds a predetermined maximum limit, the pressure relief valve 110 opens to release a portion of the fuel 14 through a vent 112. This release of a portion of the fuel 14 decreases the fluid pressure 30 to be within a desirable range. Use of the flow meter 34 can provide an indication of when the pressure relief valve 110 is actuated. In addition, as discussed above, the surge tank 28 can cooperate with the pressure relief valve 110 to maintain the fluid pressure 30 within the fuel path 24 at or below the predetermined maximum limit.

According to various aspects of the device, the pressure relief valve 110 can be actuated through communication between the flow meter 34 and the pressure relief valve 110, typically via a controller that can be operated to actuate the pressure relief valve 110. Accordingly, when the fluid pressure 30 within the fuel path 24 reaches or exceeds the predetermined upper pressure limit, the pressure relief valve 110 can be automatically actuated to reroute, expel or otherwise divert a portion of the fuel 14 to an external location. The operation of the pressure relief valve 110 and diversion of the fuel 14 lowers the fluid pressure 30 within the fuel path 24 to be within a desirable range. It should be understood that other pressure-regulating mechanisms can be used within a fuel path 24. Such pressure-regulating mechanisms can incorporate the intake valve 74, or a separate valve positioned near the fuel intake 20, for regulating the amount of fuel 14 from the fuel source 16 that is allowed to enter the fuel intake 20 and into the fuel path 24.

Referring again to FIGS. 2-4 and 7-12, the external fuel couplings 32 serve as the interface between the fuel manifold 10 and the various pieces of equipment 18. These pieces of equipment 18 operated on a particular work site typically have differing volumetric and pressure-related demands for fuel 14. To accommodate these variations in demand for fuel 14, a portion of the external fuel couplings 32 can include fuel regulators 40 to provide a flow 36 of fuel 14 at a fluid pressure 30 or volume rate lower than that present within the fuel manifold 10 and the remainder of the fuel path 24. In this manner, the fuel regulators 40, which can be operable and adjustable, provide a lower regulated pressure 42 or lower volume rate of the fuel 14 being delivered to the corresponding equipment 18. In addition, for those external fuel couplings 32 that do not have a fuel regulator 40, the surge tank 28 and the pressure relief valve 110 maintain the fluid pressure 30 within the fuel path 24. This maintenance of the fluid pressure 30 also includes maintaining a consistent fluid pressure 30 to these external fuel couplings 32 within a desirable range that is consistent with the fluid pressure 30 within the fuel path 24. Accordingly, the fuel distribution system 12 and the various external fuel couplings 32 of the fuel manifold 10 provide a system for delivering fuel 14 from a single fuel source 16 to a range of powered equipment 18 that may have a wide range of requirements for fluid pressure 30 and volumetric demands. Again, this functionality is accomplished through use of the fuel distribution system 12 described herein.

During the usable life span of the fuel distribution system 12, certain cleaning and maintenance is likely to occur. To accomplish this maintenance, a manual purge valve 120 can be included within the fuel manifold 10 for removing all of the fuel 14 contained within the fuel manifold 10 and the fuel path 24. Operation of the manual purge valve 120 can be used to release all of the fuel 14 to empty the system for repairs, replacement of parts, and other similar maintenance issues. As discussed above, the number of external fuel couplings 32 is designed into the fuel distribution system 12 to provide for the capability of simultaneously or contemporaneously fueling equipment 18 using all of the external couplings. Typically, the manual purge valve 120 is coupled with the vent 112 to allow for the release of the fuel 14 from the fuel path 24 and the fuel manifold 10. The manual purge valve 120 and the pressure relief valve 110 can be coupled to a common vent 112.

According to various aspects of the device, the equipment 18 that can be fueled using the fuel distribution system 12 can include any one of various fixtures, fuel containers, motorized equipment 18, fuel storage vehicles or other similar piece of powered equipment 18 that can be used on a construction site, drilling field, fracking site, agricultural site, facility, or other similar location having fueling or refueling needs that can be met using the various aspects of the fuel distribution system 12 described herein. As discussed above, the fuel distribution system 12 is designed to accommodate the various demand requirements for fuel 14 of the equipment 18 receiving fuel 14 from the external fuel couplings 32. Using the fuel regulators 40, the surge tank 28 and the pressure relief valve 110, multiple pieces of equipment 18 having different demands and pressure requirements for receiving fuel 14 can be accommodated.

As exemplified in FIGS. 4-5 and 7-12, the fuel manifold 10 includes 36 separate external couplings. It is contemplated that larger or fewer numbers of external couplings can be included within the fuel manifold 10 for use within the fuel distribution system 12. As discussed above, the fuel distribution system 12 is intended to be a centralized and mobile fueling station for a construction site, drilling field, agricultural facility or other similar location.

Referring now to FIGS. 1-12, having described various aspects of the fuel distribution system 12, a method 400 is disclosed for distributing fuel resources from a fuel source 16 to a number of pieces of equipment 18 using a distribution fuel manifold 10. According to the method 400, a fuel source 16 is attached to the fuel distribution system 12 at the fuel intake 20 (step 402). As discussed above, the fuel intake 20 typically includes first and second intakes 70, 72, but can include additional intakes depending upon the size and configuration of the fuel distribution system 12. An intake valve 74 is adjusted to allow fuel 14 from the fuel source 16 to enter into the fuel path 24 (step 404). When fuel 14 has entered the fuel path 24, equipment 18 is attached to one of the external fuel couplings 32 to receive fuel 14 from the fuel source 16 and the fuel manifold 10 (step 406). A fluid pressure 30 within the fuel path 24 and the fuel manifold 10 is monitored using a flow meter 34 (step 408). According to the method 400, the flow meter 34 and a pressure relief valve 110 are used to regulate a fluid pressure 30 within the fuel path 24 using the surge tank 28 and the pressure relief valve 110 (step 410). Additional fuel sources 16 and equipment 18 can be attached to the fuel distribution system 12 during a fueling condition.

In conventional fueling stations, a tanker truck is driven to a certain location and equipment to be fueled drives near the tanker truck. The tanker truck is attached directly to a separate storage tank or to the equipment to be fueled. This process is repeated until the fuel truck is empty. Typically, fuel trucks have a limited number of attachment points for delivering fuel to equipment to be fueled. Additionally, the pressure provided by the tanker truck can be unpredictable and continual attachment and disengagement of various equipment with the tanker truck can cause spillage, waste and other environmental concerns.

Through the use of the fuel distribution system 12 having a fuel manifold 10, the fuel truck 60 connects a single time to the fuel intake 20 and is not detached until the appropriate amount of fuel 14 has been dispensed from the fuel truck 60. Similarly, at the external fuel couplings 32, the equipment 18 attaches to secure attachment points within the external fuel couplings 32 to prevent spillage and waste of the fuel 14 being dispensed through the fuel distribution system 12. Additionally, the fuel distribution system 12 can act as a device for regulating the fluid pressure 30 within the fuel path 24 and between the fuel truck 60 and the equipment 18 being fueled. The external fuel couplings 32 can be in the form of dry-lock fittings, threaded fittings, self-locking fittings, and other similar coupling mechanisms.

The fuel manifold 10 can include a number of pipes that are attached together to form a manifold that can attach to the fuel path 24 and also attach to the various external couplings for dispensing fuel 14. The fuel manifold 10 is typically welded together to form a manifold structure. These welded connections can minimize leaks and spillage during use of the fuel distribution system 12. It is contemplated that other connection types may be used within the fuel manifold 10, such as mechanical connections, various adhesives, combinations thereof and other similar attachment mechanisms and methods.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A fuel distribution system comprising:

a fuel intake in communication with at least one fuel source that delivers a fuel through a fuel path;

a filtering mechanism positioned within the fuel path;

a surge tank that operates to maintain a minimum fluid pressure within the fuel path;

a fuel manifold that selectively delivers the fuel to a plurality of external fuel couplings; and a flow meter that monitors a flow of the fuel through the fuel manifold, wherein the plurality of external fuel couplings are configured to contemporaneously deliver the fuel at a consistent flow rate.

2. The fuel distribution system of claim 1, wherein the fuel intake, the surge tank and the fuel manifold are attached to a structural frame.

3. The fuel distribution system of claim 2, wherein the fuel intake and the plurality of external fuel couplings are positioned on a common side of the structural frame.

4. The fuel distribution system of claim 1, wherein the fuel intake includes first and second intakes and an intake valve to selectively place one of the first and second intakes in fluid communication with the fuel path.

5. The fuel distribution system of claim 4, wherein the at least one fuel source includes first and second fuel sources, and wherein the first intake and the second intake are configured to be selectively coupled to the first fuel source and the second fuel source, respectively.

6. The fuel distribution system of claim 1, wherein the surge tank temporarily stores a reserve portion of the fuel, and wherein the reserve portion of the fuel is used at a high-demand condition to maintain the minimum fluid pressure within the fuel path and the consistent flow rate of the fuel through the fuel manifold.

7. The fuel distribution system of claim 6, wherein the high-demand condition is characterized by the contemporaneous delivery of the fuel through at least approximately 75 percent of the external fuel couplings of the plurality of external fuel couplings and to respective pieces of powered equipment.

8. The fuel distribution system of claim 1, wherein the at least one fuel source provides a back pressure of the fuel, and wherein the surge tank cooperates with the at least one fuel source to maintain the minimum fluid pressure within the fuel path.

9. The fuel distribution system of claim 1, wherein the plurality of external fuel couplings includes 36 external fuel couplings.

10. The fuel distribution system of claim 1, wherein the surge tank and the fuel manifold are configured to provide the contemporaneous delivery of the fuel to each external fuel coupling of the plurality of external fuel couplings at the consistent flow rate.

11. The fuel distribution system of claim 1, wherein the fuel path includes a pressure relief valve, wherein when a fluid pressure of the fuel in the fuel path reaches a predetermined upper limit, the pressure relief valve operates to divert at least a portion of the fuel to an external location.

12. The fuel distribution system of claim 1, wherein the fuel is natural gas.

13. A fuel distribution system comprising:

a fuel path attached to a structural frame;

a fuel intake in selective communication with a fuel source, wherein the fuel intake delivers fuel from the fuel source to the fuel path;

a surge tank of the fuel path that is positioned within the structural frame, wherein the surge tank operates to maintain a minimum fluid pressure within the fuel path;

a fuel manifold attached to the structural frame and that selectively delivers the fuel to a plurality of external fuel couplings, wherein the plurality of external fuel couplings are positioned to extend from a common side of the structural frame; and a flow meter that monitors a flow rate of the fuel through the fuel manifold, wherein the plurality of external fuel couplings are each configured to contemporaneously deliver the fuel at a consistent flow rate.

14. The fuel distribution system of claim 13, wherein the fuel intake includes first and second intakes and an intake valve to selectively place one of the first and second intakes in fluid communication with the fuel path.

15. The fuel distribution system of claim 14, wherein the fuel source includes first and second fuel sources, and wherein the first intake and the second intake are configured to be selectively coupled to the first fuel source and the second fuel source, respectively, and wherein the first and second fuel sources selectively and alternatively provide a back pressure of the fuel.

16. The fuel distribution system of claim 15, wherein the surge tank operates with the first fuel source and the second fuel source to maintain the minimum fluid pressure within the fuel path.

17. The fuel distribution system of claim 13, wherein the surge tank temporarily stores a reserve portion of the fuel that is used at a high-demand condition to maintain the minimum fluid pressure within the fuel path and the consistent flow rate of the fuel through the fuel manifold, and wherein the fuel path includes a pressure relief valve, wherein when a fluid pressure of the fuel in the fuel path reaches a predetermined upper limit, the pressure relief valve operates to divert at least a portion of the fuel to an external location.

18. A fuel distribution system comprising:

a fuel path attached to a structural frame;

a fuel intake in selective communication with a fuel source, wherein the fuel intake delivers fuel from the fuel source to the fuel path;

a surge tank of the fuel path that is positioned within the structural frame, wherein the surge tank operates to maintain a fluid pressure within the fuel path at a minimum fluid pressure;

a fuel manifold attached to the structural frame and that selectively delivers the fuel to a plurality of external fuel couplings;

a flow meter that monitors a flow rate of the fuel through the fuel manifold and wherein the plurality of external fuel couplings are configured to contemporaneously deliver the fuel at a consistent flow rate; and a pressure relief valve that selectively operates to divert at least a portion of the fuel to an external location when the fluid pressure in the fuel path reaches a predetermined upper limit, wherein the flow meter is in communication with the surge tank and the pressure relief valve to maintain a flow of the fuel through the fuel manifold to be the consistent flow rate.

19. The fuel distribution system of claim 18, wherein a first intake and a second intake are configured to be selectively coupled to a first fuel source and a second fuel source, respectively, of the fuel source, wherein the first and second fuel sources selectively and alternatively provide a back pressure of the fuel to the fuel path, and wherein the surge tank and the pressure relief valve operate with the first fuel source and the second fuel source to maintain the minimum fluid pressure of the fuel within the fuel path.

20. The fuel distribution system of claim 18, wherein the surge tank temporarily stores a reserve portion of the fuel that is used at a high-demand condition to maintain the minimum fluid pressure within the fuel path and the consistent flow rate of the fuel through the fuel manifold.

* * * * *